United States Patent [19]

Tomori et al.

[11] Patent Number: 4,822,153

[45] Date of Patent: Apr. 18, 1989

[54] ONE-HAND ZOOM LENS BARREL

[75] Inventors: Yasumasa Tomori; Tetsuo Sekiguchi, both of Tokyo, Japan

[73] Assignee: Asahi Kogaku Kogyo Kabushiki Kaisha, Tokyo, Japan

[21] Appl. No.: 936,700

[22] Filed: Dec. 2, 1986

[30] Foreign Application Priority Data

Dec. 2, 1985 [JP] Japan ................... 60-271161

[51] Int. Cl.⁴ .................. G02B 15/14; G02B 7/02
[52] U.S. Cl. ..................... 350/429; 350/427; 350/255
[58] Field of Search ................ 350/429, 430, 255, 427

[56] References Cited

U.S. PATENT DOCUMENTS 4,275,952 6/1981 Uesugi ................... 350/429
4,726,665 2/1988 Itoh ..................... 350/426

FOREIGN PATENT DOCUMENTS 2754713 6/1978 Fed. Rep. of Germany .

Primary Examiner—John K. Corbin
Assistant Examiner—Ronald M. Kachmarik
Attorney, Agent, or Firm—Sughrue, Mion, Zinn, Macpeak, and Seas

[57] ABSTRACT

A lens barrel for a zoom lens in which zooming is achieved by moving both front and rear lenses but focussing is achieved by moving only the front lens. When a sliding ring slides linearly for zooming, a cam sleeve is rotated. A pin in the cam sleeve engages a cam groove in a moving frame for the front lens to thereby linearly move the front lens. Another cam groove in the cam sleeve engages a pin in the frame for the rear lens to thereby also linearly move it. Focussing is achieved by a threaded rotation of the frame for the front lens on the moving frame.

7 Claims, 4 Drawing Sheets

ONE-HAND ZOOM LENS BARREL

BACKGROUND OF THE INVENTION

1. Field of the Invention

The present invention relates to a lens barrel adapted for enabling a two-group type zoom lens system to be used as a so-called "one-hand zoom lens system" which is capable of achieving both zooming and focusing actions by a single operating sleeve.

2. Background of the Invention

While several types of zoom lens system are known, the two-group type features a compact overall size and achieves zooming by operation of mobile front and rear lens units and effects focusing by displacement of the front unit alone. FIG. 6 shows an illustrative design of the profile of displacements of the front lens group, F, and of the rear group, R, which occur when the focal length of a two-group type zoom lens system is varied from 36 mm to 68 mm. As is apparent, the amount of displacement of the front lens group F on the narrow-angle side is considerably larger than that of the rear group R.

A two-group zoom lens system having this characteristic in association with lens displacement is not adapted to one-hand operation in which the rear lens group is moved by displacing the front group (operating sleeve) in the direction of the optical axis. In order to solve this problem, Japanese Utility Model Publication No. 51786/1977 proposes the use of two separate operating sleeves, one for zooming and the other for focusing purposes. In other conventional zoom lens system, the direction of displacement of the front lens group F coincides with that of the rear group R on the narrow-angle side as indicated by the dashed line in FIG. 6. In this case, it is absolutely impossible to fabricate a one-hand type zoom lens barrel by employing the conventional system.

On the other hand, a one-hand zoom lens barrel has been realized for 4-group zoom lens systems as shown in Japanese Patent Publication No. 80010/1981. However, with the zoom lens system of the four-group type, only the two intermediate groups, namely, the variator group and compensator group, are displaced during zooming, and none of the problems associated with the two-group type system described above will occur.

SUMMARY OF THE INVENTION

One object, therefore, of the present invention is to provide a zoom lens barrel that is adapted to a zoom lens system of the conventional two-group type and which is capable of achieving zooming by means of displacement of a single operating sleeve in the direction of the optical axis, as well as focusing by means of turning of the same sleeve.

Another object of the present invention is to provide a zoom lens barrel which is capable of achieving zooming with its efficiency (i.e., the operating power) being maintained at a constant level over the entire zoom range.

In order to attain the aforementioned objects, the zoom lens barrel of the present invention comprises a front lens unit frame for holding the front lens unit, a front lens unit moving frame onto which said front lens unit frame is threaded, a rear lens unit frame for holding the rear lens unit, a single operating sleeve that can be turned or linearly displaced in the direction of optical axis and wnhich is turned to cause said front lens unit frame to rotate a sliding ring that is movable en masse with the single operating sleeve in the direction of optical axis, a cam sleeve that has a cam groove to permit the sleeve to rotate in operative association with the linear movement of said sliding ring, a cam groove for the front lens unit that allows the front lens unit moving frame to be displaced in the direction of optical axis as a result of the rotation of said cam sleeve, and a cam groove for the rear lens unit that allows the rear lens unit frame to be displaced in the direction of the optical axis as a result of the rotation of the cam sleeve.

DETAILED DESCRIPTION OF THE PREFERRED EMBODIMENTS

Figure 1:
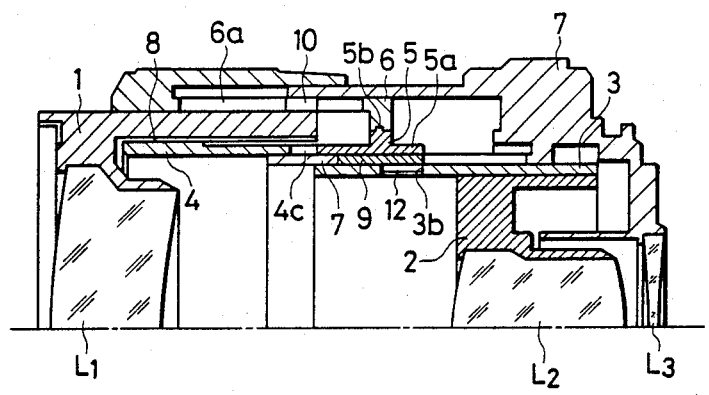
FIG. 1 is a longitudinal section of a zoom lens barrel at the wide-angle position in accordance with one embodiment of the present invention.
Figure 2:
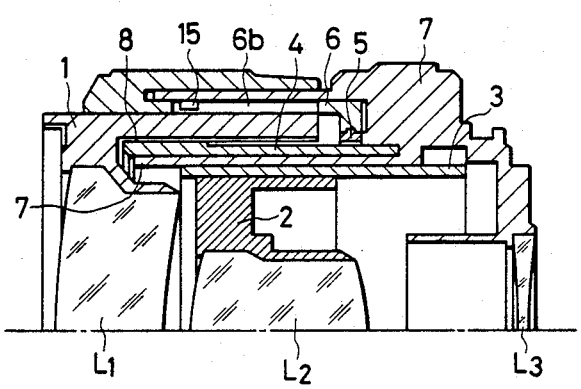
FIG. 2 is a longitudinal section of the same zoom lens barrel at the narrow-angle position.
Figure 3:
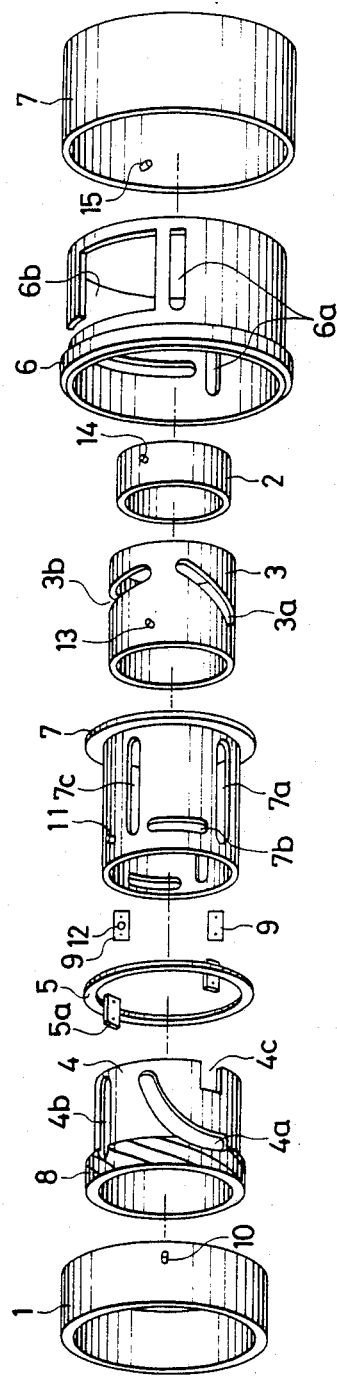
FIG. 3 is an exploded view of the same zoom lens barrel.

FIG. 1 is a cross-section in the expanded telephoto position. FIG. 2 is a cross-section in the compressed side angle position. FIG. 3 is a perspective, exploded view.

Embodiments of the present invention are hereunder described with reference to the accompanying drawings. A front lens unit frame 1 holds a front lens unit L1 in position and is threaded onto a helicoid 8 formed on a front lens unit frame moving frame 4. A rear lens unit frame 2 holds a rear lens unit L2 in position. A guide pin 14 projecting from the outer surface of the frame 2 is in engagement both with a cam groove 3b formed on a cam sleeve 3 that is fitted onto the rear lens unit frame 2 and with a straight advancement guiding groove 7c formed on a mount sleeve 7 that is to be positioned outside the rear lens unit frame 2. The mount sleeve 7 is to be coupled to the camera body and is shown in FIG. 3 as two components for the sake of clarity. A relay lens unit L3 is fixed to the rear mount sleeve 7.

The mount sleeve 7 is provided with a groove 7b that runs in the circumferential direction and which engages a guide pin 13 projecting from the outer surface of the cam sleeve 3. The pin 13 supports the cam sleeve 3 in such a manner that the cam sleeve 3 is freely rotatable, but not otherwise displaceable, over the range of movement as restricted by the groove 7b. When the cam sleeve 3 is turned, the rear lens unit frame 2 advances straight in the direction of optical axis as it is guided by the grooves 7c and 3b. In the embodiment shown, the straight advancement guiding groove 7c is linear but if it is desired to change the full-aperture diameter of the iris (not shown) in the rear lens unit frame 2 in accordance with the focal length, the groove may be formed to have an angle with respect to the optical axis.

The front lens unit moving frame 4 is fitted onto the mount sleeve 7, and a straight advancement guiding groove 4b formed on the frame 4 is in engagement with a guide pin 11 on the mount sleeve 7 such that the frame 4 is capable of moving in the direction of the optical axis but is not capable of rotational movement. The guide pin 13 on the cam sleeve 3 entends through the circumferential groove 7b to engage a front lens unit cam groove 4a formed in the surface of the frame 4. When the cam sleeve 3 rotates, the frame 4 will move in the direction of optical axis in accordance with the path defined by the cam groove 4a.

The rear portion of the mount sleeve 7 is provided with a sliding ring 5 that has the same slide diameter as the front lens unit moving frame 4 and which is fitted onto the ring 7. Since the slide diameter of the sliding ring 5 is equal to that of the frame 4, the overall size of the lens system can be reduced. Installation tabs 5a that are integral with the sliding ring 5 are adapted to advance into or retract from guide grooves 4c formed on the surface of the front lens unit moving frame 4. Each of the tabs 5a is secured to a guide plate 9 that engages with a straight advancement guiding groove 7a on the surface of the mount sleeve 7 so as to allow the sliding ring 5 to be displaced only in the direction of the optical axis. The guide plate 9 has as an integral part a guide pin 12 that extends through the guide groove 7a to project inwardly in the radial direction. The guide pin 12 engages with a cam groove 3a formed on the surface of the cam ring 3 such as to guide its rotational movement.

The lens barrel having the construction described above is operated as follows. If the sliding ring 5 is moved in the direction of the optical axis, the combination of the guide plates 9 and cam groove 3a causes the cam sleeve 3 to rotate. If the cam sleeve 3 is rotated, the combination of the cam groove 3b and guide pins 14 causes the rear lens unit frame 2 (rear lens unit L2) to move in the direction of the optical axis while at the same time the combination of guide pins 13 and the cam groove 4a causes the front lens unit frame 1 (front lens unit L1) to move in the direction of the optical axis. Therefore, if the shape of the cam grooves 3a, 3b and 4a is appropriately determined, zooming can be achieved by means of displacing the sliding ring 5 in the direction of the optical axis.

The sliding ring 5 can be displaced in the direction of the optical axis and the front lens unit frame 1 can be turned independently by manipulating a single operating sleeve 6. The sleeve 6 is in engagement with an annular projection 5b formed on the periphery of the sliding ring 5 such that the sleeve 6 is freely rotatable while it is displaceable in the direction of the optical axis together with the sliding ring 5. The sleeve 6 is provided with linear coupling grooves 6a. Coupling pins 10 projecting from the surface of the front lens unit frame 1 are in engagement with these grooves 6a such that the frame can be rotated by turning the sleeve 6. A regulating pin 15 projecting from the inner surface of the rear mount sleeve 7 is positioned within a groove 6b such that it will regulate the distance over which the operating sleeve 6 can be rotated.

In order to achieve focusing with the zoom lens barrel having the construction described above, the operating sleeve 6 may simply be rotated so that the combination of the linear coupling grooves 6a and coupling pins 10 permits the front lens unit frame 1 to rotate as the front lens unit frame 1 (or front lens unit L1) is displaced in the direction of the optical axis, following the path provided by the helicoid 8. As described in the preceding paragraph, zooming can be achieved by moving the operating sleeve 6 in the direction of the optical axis so as to cause simultaneous movement of the sliding ring 5.

Figure 7:
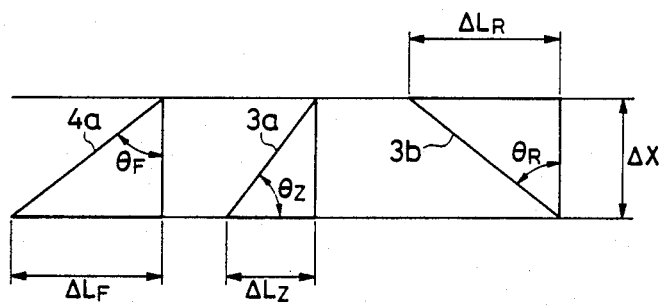
FIG. 7 is a diagram showing the relationship between the gradient of an individual cam groove and each of the length of the cam groove in its developed state corresponding to the angle of rotation for a small change in the focal distance and the displacement of an associated component in the direction of optical axis.

The curved slope of the cam grooves 3a, 3b and 4a may be set to such values that the movement of the sliding ring 5 in the direction of the optical axis allows the cam sleeve 3 to rotate, which in turn causes the front lens unit moving frame 4 and the rear lens unit frame 2 to be displaced in the direction of the optical axis. The relationship between the curved slope of each cam groove and the displacement of the frames 4 and 2 is shown in FIG. 7. Suppose that the individual cam grooves are inclined at angles, $\theta_Z$, $\theta_R$ and $\theta_F$, respectively, which vary with respect to the position along the optical axis. If these angles are determined in such a manner that upon diplacement of the sliding ring 5 by an amount of $\Delta L_x$ in the direction of the optical axis, the cam sleeve 3 is rotated by $\Delta x$, which then causes the frames 2 and 4 to be displaced by respective amounts of $\Delta L_R$ and $\Delta L_F$ in the direction of the optical axis, zooming can be achieved by virtue of the displacement of the sliding ring 5 in the direction of the optical axis. It is empirically known that the system operates satisfactorily as a one-hand zoom lens system if $\theta_Z$, $\theta_R$ and $\theta_F$ are set to values that do not exceed 60°. These angles are determined for each small change in the focal length and integrated to define the profile (curved slope) of an individual cam groove.

Figure 4:
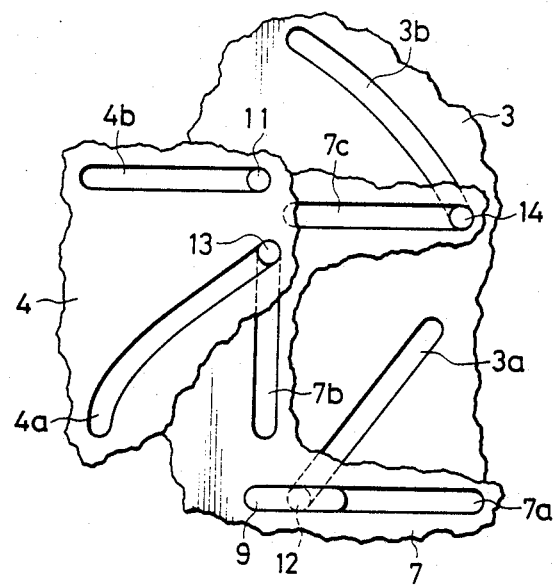
FIG. 4 is a developed view showing the relationship between cam grooves and straight advancement guiding grooves in the lens barrel at the wide-angle position.

With reference to the developed (unfolded) views of FIGS. 4 and 7, $\theta_Z$ is the angle between a tangent to the groove 3a at the point along the groove which the angle is to be measured, and a line parallel to the optical axis and passing through the point of tangency, $\theta_R$ and $\theta_F$ are the angles between tangents to the grooves 3b, 4a, respectively, and a line normal to the optical axis and passing through the point of tangency.

In order to provide a constant efficiency of zooming over the entire zoom range, or over the full range of displacement of the sliding ring 5, it is necessary that all the angles, $\theta_Z$, $\theta_R$ and $\theta_F$, shown in FIG. 7 satisfy the following equation (1) for each small change in the focal length:

$$\tan \theta_F + \tan \theta_R + \tan \theta_Z = K (\text{constant}) \tag{1}$$

An even smoother operation can be achieved if $\theta_Z$, is rendered equal to $\theta_F$ or $\theta_R$ depending upon the magnitude of displacement $\Delta L_F$ of the front lens unit moving frame 4 in the direction of the optical axis for a unit angle of rotation in comparison with the displacement $\Delta L_R$ of the rear lens unit frame 2. This relation may be expressed as follows:

$$\theta_F = \theta_Z \text{ if } \Delta L_F \geq \Delta L_R,$$

$$\theta_R = \theta_Z \text{ if } \Delta L_F < \Delta L_R.$$

For practical purposes, the efficiency of zooming can be approximated by the sum of the tangents of the angles of the individual cam grooves, so a constant zooming efficiency can be achieved by maintaining the value of K at a constant level.

If $\Delta L_F \geq \Delta L_R$, Eq. (1) can be rewritten as:

$$2 \tan \theta_F + \tan \theta_R = K \quad (2)$$

and if $\Delta L_F < \Delta L_R$ Eq. (1) can be rewritten as:

$$\tan \theta_F + 2 \tan \theta_R = K \quad (3)$$

Since $\tan \theta_F = \Delta L_F/\Delta x$, $\tan \theta_R = \Delta L_R/\Delta x$ and $\tan \theta_Z = \Delta x/\Delta L_Z$, then Eqs. (2) and (3) can be rewritten as follows:

$$(2\Delta L_F + \Delta L_R)/\Delta x = K \text{ (if } \Delta L_F \geq \Delta L_R) \quad (4)$$

$$(\Delta L_F + 2\Delta L_R)/\Delta x = K \text{ (if } \Delta L_F < \Delta L_R) \quad (5)$$

Figure 6:
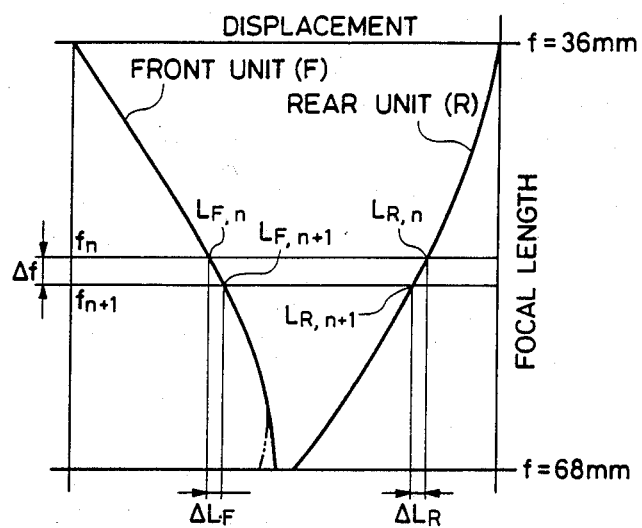
FIG. 6 is a diagram showing the profile of the displacement of the front and rear lens unit in a two-group type zoom lens system.

Table 1 is a data sheet for the optics employed in a two-group type zoom lens system having the profile of displacements of the individual lens groups shown in FIG. 6. For details of this system, see U.S. patent application Ser. No. 853,243 filed Apr. 17, 1986, now U.S. Pat. No. 4,726,665, by the present applicant. This table is based on the assumptions that $K=3.31$ and that the focal length, f, is changed by a small increment of 0.5 mm. Each increment of the total cam groove movement ($\alpha$) in Table 1 corresponds to the (incremental) circumferential distance of rotation in degree which corresponds to $\Delta x$ and is determined in terms of angle (in degrees) when each of the cam grooves 3a, 3b and 4a (assumed to have a reference diameter setting of 38.5 mm in diameter) is seen from the front. The size of the cam groove 3a as measured in the direction of the optical axis is expressed by $L_Z = \Sigma \Delta L_Z$. Similarly, the dimensions of the cam grooves 3b and 4a, as measured in the direction of the optical axis, are expressed by $L_R$ and $L_F$, respectively.

TABLE 1

| focal length f (mm) | front lens group movement $L_F$ (mm) | rear lens group movement $L_R$ (mm) | zooming ring movement $L_Z$ (mm) | cam groove movement $\alpha$ (°) | front lens group cam groove angle $\theta_F$ (°) | rear lens group cam groove angle $\theta_R$ (°) |
|---|---|---|---|---|---|---|
| 36 | 0 | 0 | 0 | 0 | | |
| 36.5 | 0.38 | 0.14 | 0.19 | 0.80 | 54.5 | 27.0 |
| 37 | 1.08 | 0.40 | 0.55 | 2.30 | 54.4 | 27.5 |
| 37.5 | 1.76 | 0.66 | 0.91 | 3.76 | 54.2 | 28.3 |
| 38 | 2.41 | 0.93 | 1.25 | 5.17 | 54.0 | 29.0 |
| 38.5 | 3.04 | 1.19 | 1.59 | 6.54 | 53.9 | 29.8 |
| 39 | 3.65 | 1.45 | 1.92 | 7.87 | 53.7 | 30.5 |
| 39.5 | 4.24 | 1.72 | 2.24 | 9.16 | 53.5 | 31.3 |
| 40 | 4.80 | 1.98 | 2.55 | 10.41 | 53.3 | 32.1 |
| 40.5 | 5.34 | 2.24 | 2.86 | 11.62 | 53.1 | 32.9 |
| 41 | 5.87 | 2.51 | 3.16 | 12.80 | 52.9 | 33.7 |
| 41.5 | 6.37 | 2.77 | 3.45 | 13.95 | 52.7 | 34.5 |
| 42 | 6.86 | 3.04 | 3.74 | 15.06 | 52.5 | 35.3 |
| 42.5 | 7.32 | 3.30 | 4.02 | 16.14 | 52.2 | 36.1 |
| 43 | 7.77 | 3.57 | 4.29 | 17.18 | 52.0 | 36.9 |
| 43.5 | 8.21 | 3.83 | 4.56 | 18.20 | 51.8 | 37.7 |
| 44 | 8.63 | 4.09 | 4.83 | 19.19 | 51.5 | 38.5 |
| 44.5 | 9.03 | 4.36 | 5.09 | 20.16 | 51.2 | 39.3 |
| 45 | 9.42 | 4.62 | 5.34 | 21.09 | 51.0 | 40.1 |
| 45.5 | 9.79 | 4.89 | 5.59 | 22.00 | 50.7 | 40.9 |
| 46 | 10.15 | 5.15 | 5.84 | 22.89 | 50.4 | 41.7 |
| 46.5 | 10.50 | 5.42 | 6.08 | 23.75 | 50.1 | 42.5 |
| 47 | 10.83 | 5.68 | 6.31 | 24.58 | 49.8 | 43.3 |
| 47.5 | 11.15 | 5.95 | 6.55 | 25.40 | 49.5 | 44.1 |
| 48 | 11.46 | 6.21 | 6.78 | 26.19 | 49.2 | 44.9 |
| 48.5 | 11.76 | 6.48 | 7.01 | 26.96 | 48.8 | 45.7 |
| 49 | 12.04 | 6.74 | 7.23 | 27.71 | 48.5 | 46.4 |
| 49.5 | 12.31 | 7.01 | 7.45 | 28.44 | 48.1 | 47.2 |
| 50 | 12.58 | 7.28 | 7.67 | 29.16 | 47.6 | 47.9 |
| 50.5 | 12.83 | 7.54 | 7.88 | 29.86 | 46.9 | 48.3 |
| 51 | 13.07 | 7.81 | 8.08 | 30.56 | 46.0 | 48.7 |
| 51.5 | 13.30 | 8.07 | 8.28 | 31.24 | 45.2 | 49.0 |

TABLE 1-continued

| focal length f (mm) | front lens group movement $L_F$ (mm) | rear lens group movement $L_R$ (mm) | zooming ring movement $L_Z$ (mm) | cam groove movement $\alpha$ (°) | front lens group cam groove angle $\theta_F$ (°) | rear lens group cam groove angle $\theta_R$ (°) |
|---|---|---|---|---|---|---|
| 52 | 13.53 | 8.34 | 8.48 | 31.92 | 44.4 | 49.4 |
| 52.5 | 13.74 | 8.60 | 8.67 | 32.59 | 43.5 | 49.7 |
| 53 | 13.94 | 8.87 | 8.85 | 33.25 | 42.6 | 50.1 |
| 53.5 | 14.14 | 9.13 | 9.03 | 33.91 | 41.7 | 50.4 |
| 54 | 14.33 | 9.40 | 9.21 | 34.55 | 40.7 | 50.8 |
| 54.5 | 14.50 | 9.67 | 9.39 | 35.19 | 39.7 | 51.1 |
| 55 | 14.67 | 9.93 | 9.55 | 35.82 | 38.8 | 51.4 |
| 55.5 | 14.84 | 10.20 | 9.72 | 36.45 | 37.7 | 51.7 |
| 56 | 14.99 | 10.46 | 9.88 | 37.06 | 36.7 | 52.1 |
| 56.5 | 15.14 | 10.73 | 10.04 | 37.67 | 35.7 | 52.4 |
| 57 | 15.28 | 11.00 | 10.19 | 38.28 | 34.6 | 52.7 |
| 57.5 | 15.41 | 11.26 | 10.35 | 38.88 | 33.5 | 53.0 |
| 58 | 15.54 | 11.53 | 10.50 | 39.47 | 32.3 | 53.2 |
| 58.5 | 15.66 | 11.79 | 10.64 | 40.05 | 31.2 | 53.5 |
| 59 | 15.77 | 12.06 | 10.78 | 40.63 | 30.0 | 53.8 |
| 59.5 | 15.88 | 12.33 | 10.92 | 41.21 | 28.9 | 54.1 |
| 60 | 15.98 | 12.59 | 11.06 | 41.77 | 27.6 | 54.3 |
| 60.5 | 16.07 | 12.86 | 11.19 | 42.34 | 26.4 | 54.6 |
| 61 | 16.16 | 13.13 | 11.33 | 42.90 | 25.1 | 54.9 |
| 61.5 | 16.24 | 13.39 | 11.46 | 43.45 | 23.9 | 55.1 |
| 62 | 16.31 | 13.66 | 11.58 | 44.00 | 22.6 | 55.4 |
| 62.5 | 16.39 | 13.93 | 11.71 | 44.54 | 21.3 | 55.6 |
| 63 | 16.45 | 14.19 | 11.83 | 45.08 | 19.9 | 55.8 |
| 63.5 | 16.51 | 14.46 | 11.95 | 45.61 | 18.6 | 56.1 |
| 64 | 16.57 | 14.72 | 12.07 | 46.14 | 17.3 | 56.3 |
| 64.5 | 16.62 | 14.99 | 12.19 | 46.67 | 15.9 | 56.5 |
| 65 | 16.66 | 15.26 | 12.30 | 47.19 | 14.5 | 56.8 |
| 65.5 | 16.70 | 15.52 | 12.41 | 47.70 | 13.2 | 57.0 |
| 66 | 16.74 | 15.79 | 12.52 | 48.21 | 11.8 | 57.2 |
| 66.5 | 16.77 | 16.06 | 12.63 | 48.72 | 10.4 | 57.4 |
| 67 | 16.80 | 16.32 | 12.74 | 49.23 | 9.0 | 57.6 |
| 67.5 | 16.82 | 16.59 | 12.85 | 49.73 | 7.7 | 57.8 |
| 68 | 16.83 | 16.86 | 12.95 | 50.22 | 6.3 | 58.0 |

With the angles of the cam grooves 3a, 3b and 4a being determined in the manner described above, no cam angle will exceed 60° even on the narrow-angle side where the front lens unit L1 is displaced by an amount on the order of 1/100 mm for each 0.5 mm change in the focal length. Therefore, by employing the lens barrel of the present invention, a two-group type zoom lens system can be satisfactorily operated as a one-hand version. This can also be realized with a two-group type zoom lens system having the displacement profile shown by the dashed line in FIG. 6. The setting of the smallest change in the focal length f depends on the machining precision such as by NC machining and the 0.5 mm increments assumed for the data in Table 1 should be considered as a mere example.

Figure 5:
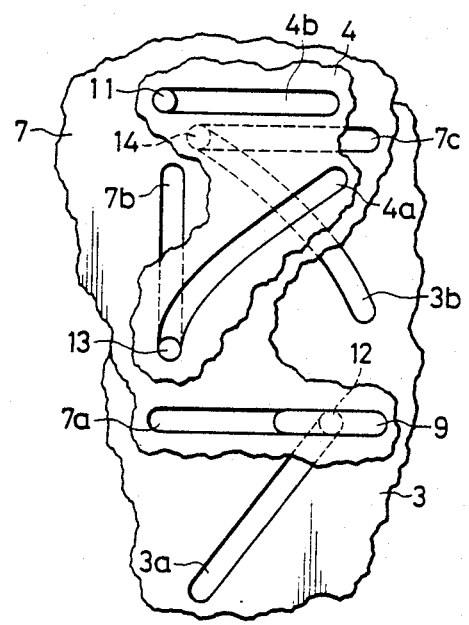
FIG. 5 is a developed view showing the relationship between cam grooves and straight advancement guiding grooves in the narrow-angle position.

FIGS. 4 and 5 illustrate two specific configurations of the cam grooves 3a, 3b and 4a that can produce the profile of displacement shown in FIG. 6. The relationship between the cam groove 4a and the guide pin 13 is by no means absolute and so, theoretically, the cam groove may be formed on the cam sleeve 3, with the guide pin being formed on the front lens unit moving frame 4. For the same reason, it is theoretically possible to provide the cam groove 3b on the rear lens unit frame 2, with the mating guide pin 14 being provided on the cam sleeve 3.

As will be apparent from the foregoing description, the lens barrel of the present invention is characterized by rotating the cam sleeve 3 with the aid of the sliding ring 5 which advances straight in the direction of optical axis, with the result that the rotating cam sleeve 3 allows both the front lens unit moving frame 4 (or the front lens unit frame 1) and the rear lens unit frame 2 to be displaced in the direction of optical axis. It should particularly be noted that a one-hand zoom lens system cannot be realized if the sliding ring 5 is not employed, as explained hereinafter.

If the sliding ring 5, guide pin 12 and guide plate 9 are absent from a two-group type zoom lens which has the profile of displacement shown in Table 1, the cam groove 4a becomes unnecessary. In this case, a one-hand type zoom lens system could be realized if the guide pin 12 were fixed to the front lens unit moving frame 4 and if the force enabling the frame 4 to be displaced in the direction of optical axis were utilized to rotate the cam sleeve 3 by the combined action of the guide pin 12 and the cam groove 3a. Then, the rear lens unit frame would be advanced or retracted by the combined action of the cam groove 3b and the guide pin 14. In other words, the only parameter that is necessary for achieving zooming is the operative relationship between the cam groove 3a having an angle $\theta_Z$ for a given position along the cam groove and the cam groove 3b having a an angle $\theta_R$ for a given position along the cam groove. In this instance, a displacement of the cam sleeve 3 by an amount of $\Delta L_Z$ will cause it to rotate by an amount corresponding to $\Delta x$, which in turn causes the rear lens unit frame 1 to be displaced by an amount of $\Delta L_R$. Reasonable design of the angles at each incremental position of the two cam groove will dictate that $\theta_Z = \theta_R$. Therefore, $$\tan \theta_Z = \tan \theta_R = \Delta x / \Delta L_Z = \Delta L_R / \Delta x \qquad (6)$$

$$\Delta x = \sqrt{\Delta L_Z \cdot \Delta L_R} \qquad (7).$$

Referring back to Table 1, the angle of each cam groove for a small change in the focal length (f) from 67.5 mm and 68 mm can be determined as follows:

$\Delta L_Z = 0.01$ (as calculated from $\Delta L_F$ in Table 1) and $\Delta L_R = 0.10$. If these values are substituted in Eqs. (7) and (6), we obtain $\Delta x = 0.032$ and $\theta_Z = \theta_R = 72.42°$.

As mentioned earlier in this specification, no cam groove should have an angle exceeding 60° in order to ensure practical zooming operation. Therefore, a one-hand zoom lens system cannot be achieved in the absence of the sliding ring 5.

As described in the foregoing pages, the zoom lens barrel of the present invention is adapted for the purpose of realizing a one-hand zoom lens system of the two-group type that is easy to operate and which produces a substantially constant operating power over the entire zoom range.

What is claimed is:

1. A lens barrel adapted to be used in a zoom lens system of the two-group type which achieves zooming by moving front and rear lens units in the direction of an optical axis of said lens units and which achieves focusing by displacing the front lens unit in the direction of the optical axis, said barrel comprising:

(a) a front lens unit frame (1) for holding a front lens unit;
(b) a front lens unit moving frame (4) onto which said front lens unit frame is threaded;
(c) a rear lens unit frame (2) for holding a rear lens unit;
(d) a single operating sleeve (6) that can be rotated or displaced in the direction of the optical axis and which is coupled to said front lens unit frame, whereby turning said operating sleeve causes said front lens unit frame to rotate;
(e) a sliding ring (5) that is movable en masse with said single operating sleeve in the direction of the optical axis;
(f) a cam sleeve (3) that has a first cam groove (3a) to permit said sleeve to rotate in operative association with the linear movement of said sliding ring;
(g) a second cam groove (4a) for said front lens unit that allows said front lens unit moving frame to be displaced in the direction of the optical axis as a result of the rotation of said cam sleeve; and
(h) a third cam groove (3b) for said rear lens unit that allows said rear lens frame to be displaced in the direction of the optical axis as a result of the rotation of said cam sleeve, wherein said first, second and third cam grooves are shaped to satisfy the following relation over an entire zoom range of the lens system:

$\tan \theta_F + \tan \theta_R + \tan \theta_Z = K$.

where $\theta_Z$ is the angle, with respect to the optical axis, of the first cam groove for a small change in focal length of the lens system;
$\theta_F$ is the angle, with respect to the optical axis, of the second cam groove for a small change in the focal length;
$\theta_R$ is the angle, with respect to the optical axis, of the third cam groove for a small change in the focal length;
K is a constant.

2. A zoom lens barrel according to claim 1 wherein each of the angles, $\theta_F$, $\theta_R$ and $\theta_Z$, of each of said first, second and third cam grooves does not exceed 60°.

3. A zoom lens barrel according to claim 2 wherein said front lens unit frame has a slide diameter equal to that of said sliding ring.

4. A zoom lens barrel according to claim 1 wherein $\theta_Z$ for a small change in the focal length is set to a value equal to whichever is the greater of $\theta_F$ and $\theta_R$.

5. A zoom lens barrel according to claim 4 wherein said front lens unit frame has a slide diameter equal that of said sliding ring.

6. A zoom lens barrel according to wherein said front lens unit frame has a slide diameter equal to that of said sliding ring.

7. A zoom lens barrel according to claim 1, wherein said second cam groove is contained in said front lens unit moving frame and said third cam groove is contained in said cam sleeve.

* * * * *